(No Model.)
F. X. BYERLEY.
MANUFACTURE OF ASPHALT, &c., FROM PETROLEUM.
No. 524,130. Patented Aug. 7, 1894.
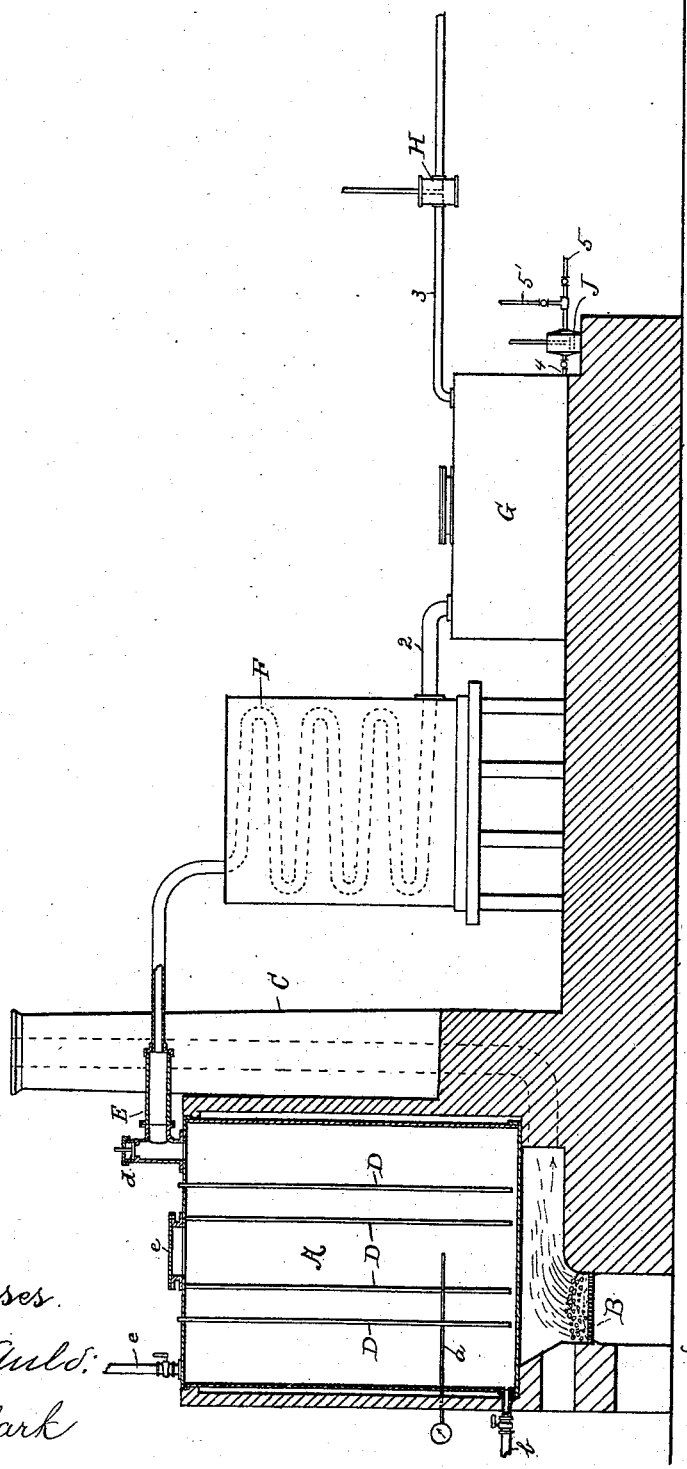
Witnesses
R. E. Auld.
E. B. Clark
Inventor
Francis X. Byerley
By Chas. J. Hedrick
his attorney

UNITED STATES PATENT OFFICE.

FRANCIS X. BYERLEY, OF CLEVELAND, OHIO.

MANUFACTURE OF ASPHALT, &c., FROM PETROLEUM.

SPECIFICATION forming part of Letters Patent No. 524,130, dated August 7, 1894.

Application filed April 28, 1893. Serial No. 472,235. (No specimens.)

*To all whom it may concern:*

Be it known that I, FRANCIS X. BYERLEY, a citizen of the United States, residing at Cleveland, in the county of Cuyahoga and State of Ohio, have invented certain new and useful Improvements in the Manufacture of Asphalt and other Products from Petroleum; and I do hereby declare the following to be a full, clear, and exact description of the invention, such as will enable others skilled in the art to which it appertains to make and use the same.

This invention relates more particularly to the manufacture of solid bodies from petroleum; but each of the improvements constituting the same is included for all the uses to which it may be adapted.

In the manufacture of petroleum products, it has been customary to distill the crude oil in externally heated stills, so as to drive off the naphtha and the burning oil, with more or less of the heavier oils, leaving a residuum or tar which can be further distilled, if desired, down to a solid body. As the distillation of petroleum residuum or tar has heretofore been commonly conducted, it has resulted, when pushed to the production in the still of a body which is solid in the still or which solidifies on cooling, in the formation of a coke or a coke-containing pitch.

In accordance with the present invention petroleum residuum or tar is distilled down to a solid body by a prolonged exposure to a pitch-forming non-coking temperature, say about six hundred degrees Fahrenheit, (600° F.,) more or less, with agitation and exposure to air or analogous gas or gaseous mixture. By this means, are produced black (or very dark brown) bodies readily soluble in petroleum naphtha, say benzine of 62° Baumé, which the cokes or pitches heretofore made from petroleum, so far as I am aware, are not unless in comparatively small proportions. These bodies are believed to be new and are included in the invention as new articles of manufacture, as well as their process of production. They vary, according to the extent to which the process is pushed, in hardness at atmospheric temperatures (say at 60° Fahrenheit) from a rubber like consistency to a mass of a hardness and conchoidal fracture like the natural asphaltums, (as for example Trinidad asphaltum and the so-called gilsonite from Utah.) At a lower temperature the less hard bodies become harder and have a conchoidal fracture. The bodies melt at from about 200° Fahrenheit to about 400° Fahrenheit. The higher melting bodies, say those melting at from 350° Fahrenheit to 400° Fahrenheit, or in other words those which have been sufficiently freed from oil to have a drying quality, are well adapted to varnish-making being employed in place of the natural asphaltum. These bodies may be used also for paving and roofing and analogous purposes to which natural asphaltums are applied, but in order to melt at the temperatures which workers in those industries have found convenient to use, it is necessary, as with Trinidad asphaltum, to employ oil or the like to render them sufficiently limpid at such temperatures; and it is better therefore for such uses to employ bodies of less hardness, which have sufficient oily matter present to melt at a convenient temperature.

The composition of crude petroleums from different localities differs as is well known, but such difference to the best of my knowledge and belief does not substantially affect the present invention. I have successfully treated the residuum of tar from ordinary distillation of petroleum from the Ohio oil regions about Lima, and while residuum or tar from such oil (as contradistinguished from Pennsylvania oil) is specially intended under the designation of petroleum tar, yet it is intended to include also tar or residuum from other petroleum. It may further be observed that the designation of petroleum tar is intended to apply to undistilled residues and to distillates, which may be treated, in like manner. It is not necessary that the petroleum tar be formed by ordinary distillation, nor is the invention restricted to any particular gravity of tar. Crude oil might itself be placed in a still and not removed until an asphaltic residue is obtained, petroleum tar within the meaning of this specification, being formed during the distillation. It is advantageous and constitutes a special improvement to aid the distillation by an exhaust applied to the products of distillation, which is most advantageously such as to draw the air by the atmospheric pressure into the tar.

The distillation and formation of the asphalt may thus take place at a lower temperature which favors the desired changes in the tar.

Another special improvement, particularly useful in the production of a varnish asphaltum, consists in adding rosin, or similar body, to the petroleum tar or tar-forming petroleum (distillate or undistilled) of the Lima class or of other description. This rosin does not remain as such in the asphaltum, but exerts a beneficial influence on the asphalt-forming operation and is believed to improve the grade of the harder asphaltum for varnish-making. This part of the invention also extends generally to the distillation of rosin with mineral tar to form asphaltic or pitchy bodies although the rosin is specially advantageous in the formation of my new or improved asphalts by the process above set forth.

Hereinabove reference has only been made to the treatment of petroleum tar (or residuum) as within the invention; but, there are other well known varieties of tar or pitch forming oil, (as coal tar for example) convertible into pitch (and afterward into coke) by heat: so far as I am aware, it is new generally to subject a natural or artificial tar or pitch-forming oil to a pitch-forming non-coking temperature, or indeed to a pitch-forming temperature whether accompanied by more or less coking or not, with agitation and exposure to air or analogous gas or gaseous mixture; and each of such general treatments is included in the invention. In treating Lima tar (i.e. tar from petroleum of the Lima class) in this way the yield of solid products is much greater than can be (or at least so far as I am aware has been) produced by the ordinary tar distillation, the solid products themselves being also as before mentioned of a new or improved kind: the same remarks are applicable to other petroleum tar, as Pennsylvania tar: by treating other tars or pitch-forming oils (whether natural or artificial) to a pitch-forming non-coking temperature (corresponding with the particular oil or tar treated) with agitation and exposure to air or analogous gas or gaseous mixture, pitches or asphaltic compounds will be produced. It is not intended, however, to assert that such pitches necessarily differ from the pitches heretofore made from the same tars or oils in the same manner and extent as the new or improved petroleum asphaltum (or asphaltums) of the present invention differ from petroleum pitch heretofore made; nor that there will be the same increase in yield.

Further in practically carrying the invention into effect, the oil or tar when put into the converting still will contain more or less oil (lubricating or fuel oil, or lubricating fuel and burning oil in the case of petroleum, or it may be all or part of the naphtha also) which must be distilled off before the pitch-forming temperature is reached: it is most advantageous (and a special improvement) to distill off this oil as well as the oil which is distilled off in the pitch-forming operation properly speaking, by the aid of an exhaust applied to the products of distillation and operating to draw air into and through the liquid contents of the still which contents are gradually raised by external heat to a higher and higher temperature as distillation proceeds.

The accompanying drawing which forms part of this specification is an elevation partly in section of what is considered the best form of a new distilling apparatus, which constitutes a part of the invention and is adapted for use in carrying the other parts of the invention into effect.

In describing the drawing and the process as carried into effect thereby, it will be understood that details are given by way of illustration to enable those skilled in the art better to use the invention and not as restricting the latter to such details.

The still A is provided with a fire chamber B of ordinary construction with chimney C; and a number of small pipes D arranged at different parts of the still extend into the oil space thereof. They are open at both ends, the lower ends being in the oil near the bottom of the still and the upper ends in communication with the air. The openings at the lower ends of the pipes are the full diameters of the pipe bores to diminish the danger of clogging and to facilitate clearing. It is advantageous to employ a number of pipes so as to effect a distribution of the air throughout the oil (or tar) and to use pipes which are straight or sufficiently so for the passage through them of a clearing tool from the outside. The still A is also provided with a pyrometer a, and draw off b and a filling pipe c, a safety valve d not loaded, and a manhole e. The gooseneck E connects the vapor space of the still with a condenser F whose outlet in turn communicates through a pipe 2, receiver G and pipe 3 with the suction port of an air pump H. The pipes 2 and 3 open into the upper part of the receiver. A liquid pump J is connected by a pipe 4 with the lower part of the receiver, and has a branched discharge pipe 5 and 5', or as an equivalent for such branched pipe a flexible pipe or hose, so that the liquid contents of said receiver can be discharged toward or into one or other of two or more points or receptacles.

The still A being filled nearly full of say Lima tar of about .900 specific gravity (26° Baumé to 28° Baumé) or for making superior varnish-asphaltum with a mixture of such tar and rosin (four pounds of rosin to ninety-six pounds of tar, or in greater or less proportion); a fire is started in the chamber B, and the air pump H worked. The fire is made up enough to give a good run, say about twenty to thirty gallons an hour (more or less) from a charge in still A of about three thousand gallons, and a vacuum is maintained in the receiver G sufficient to induce a free flow of air through the pipes D into the liquid contents of the still A, or somewhat more than will counterbalance the column of heated and aerated oil. If the still A be ten feet high by eight feet in diameter, five one inch pipes D will suffice. It may be filled say eight tenths full; and the barometrical pressure in receiver may in the early part of the run be kept about six or seven inches of mercury below the outside atmospheric pressure, the temperature being about 400° Fahrenheit more or less depending somewhat upon the tar, as those skilled in the art will understand. With a double acting air pump of eight inches diameter of piston and sixteen inch stroke, a speed of about seventy five revolutions more or less (or complete reciprocations) per minute will suffice with a still of the size before mentioned. As distillation proceeds oil and water vapors pass through the gooseneck E to the condenser F where they are in whole or in part reduced to a liquid state and from which they pass into receiver G. The temperature of the still is raised gradually so as to keep up a good flow (say twenty gallons per hour) but after a time (say after fifty to seventy five hours, when about half the contents of the still have been distilled off and the temperature approximates 600° Fahrenheit more or less) the flow of the distillate diminishes rapidly, becoming say only about three or four gallons an hour of mixed oil and water. The distillation, or more properly the pitch-forming operation, is continued without or with only slight increase of temperature for say fifty to seventy five hours longer, until a specimen withdrawn exhibits on solidifying the proper hardness according to the purpose for which the asphaltum is intended. There are known appliances for testing the hardness of asphalt by a needle, and these can be used for testing a sample: but a more convenient test is to chew the specimen. While 600° Fahrenheit has been mentioned as about the maximum (this has given excellent results with Lima tar), it must not be understood that such temperature cannot be exceeded with Lima tar, for in some instances a good asphaltum, soluble in petroleum naphtha, has been produced when the temperature has reached 700° Fahrenheit; but it is preferred to work at the lower temperature. It is also not to be understood that the temperature most advantageous for Lima tar is necessarily the most advantageous for other petroleum tar or tar other than petroleum tar; but from the illustration and working figures given, those skilled in the art will be enabled to effect a useful result on other tars.

It is important in all cases to avoid a coking temperature, as the coke produced is not only itself an injurious ingredient in the asphaltum, but its formation indicates an alteration in the tar, or in bodies thereof, which it is desirable to avoid.

Of course, if those working the process are satisfied with the article produced whether as respects the distillate or the solid or solidifying residue, the temperature can be carried upward with aspiration of air, until coking takes place: in such case there are advantages over the ordinary distillation, but an excessive temperature with aspiration of air is dangerous. The oil and water in the receiver G separate indistinct layers by gravity: from time to time the water is pumped out by pump J through say the pipe 5 to waste, and when oil commences to come the pipe 5 is closed and the oil is removed by the same pump through pipe 5′ to a receptacle for use as fuel or other purpose. The oil during the later stage contains considerable paraffine, and to collect this such oil can be pumped through another branch like 5′ to a different receiver.

If it be desired to treat a lighter gravity of petroleum, say Lima crude for example; the distillation is commenced (with or without aspiration of air through pipes D) at a lower temperature which is gradually increased, and the distillation with aspiration of air is at length carried on at a pitch-forming non-coking temperature. The entire operation of course takes longer than when commencing with tar. The preliminary distillation is most advantageously carried on with aspiration of air, for one reason because the naphtha and burning oil with some still heavier oil, are carried off at a lower temperature, and for another reason because the residuum (or liquid in the still) becomes it is thought in better condition for the pitch-forming stage than if the distillation be performed in the ordinary way. As the naphtha comes over it collects in the receiver G with water of condensation in a layer above such water. The layers are pumped off by the pump J in different directions through pipes 5 and 5′ respectively and as oils of different gravity (as burning oil after naphtha for example) collect in the receiver G they are pumped through pipe 5′ and other branches (not shown) to different receivers according to the customary cuts of the manufacturer, or as he may think advisable.

If Lima tar of a heavier gravity is to be treated, the distillation commences at a higher temperature, and the entire operation is ended sooner.

The making of asphaltic or pitchy bodies from pitch-yielding tar in general by operations therein severally specified is included in the eighth and ninth of the clauses of claim following; the distillation as well of pitch-forming oil (including tar) in general as of petroleum (including petroleum tar) in particular, by the means therein specified is included in the tenth clause of claim following; the first, third, fourth, sixth and seventh clauses of claim following are restricted to the making by the operations therein severally specified, of asphaltic products, or of asphaltic or pitchy bodies, from petroleum tar in contradistinction to other tar, as coal tar for example; the fifth clause of claim following includes the making of asphaltic or pitchy bodies by the special distillations therein specified of a mixture as well of mineral tar (or tar-forming mineral oil) in general and rosin, as of petroleum tar (or petroleum) in particular and rosin; and the second clause of claim covers material as therein specified having characteristics belonging to petroleum products, in contradistinction to previously known natural or artificial products, among which latter may be mentioned Trinidad asphaltum, the so-called gilsonite from Utah, pitch or other products from petroleum or from coal tar or from other tar by processes heretofore practiced in the United States or described in prior printed publications and patents.

I claim as my invention or discovery—

1. The process of making asphaltic products, by prolonged exposure of petroleum tar to a pitch forming non-coking temperature in a still, with agitation of said tar, and exposure of the same to air, substantially as described.

2. The herein described new asphaltic petroleum products, soluble in benzine, varying in hardness at atmospheric temperatures from a rubber like consistency to a mass of a hardness and conchoidal fracture like the natural asphaltums, the less hard having also a conchoidal fracture at lower temperatures, melting at from about 200° Fahrenheit to about 400° Fahrenheit according to hardness, and in general having characteristics belonging to asphaltic residual products from a prolonged exposure of petroleum tar to a pitch-forming non-coking temperature in a still with agitation of said tar and exposure of the same to air in contradistinction to previously known natural or artificial products of a more or less asphaltic character, substantially as set forth.

3. The process of making asphaltic products, by prolonged exposure of petroleum tar to a pitch-forming non-coking temperature in a still, with exhaustion of the products of distillation, agitation of the tar, and exposure of said tar to air, substantially as described.

4. The process of making asphaltic products, by distilling a mixture of petroleum tar and rosin, and subjecting the mixture or the residue thereof to a prolonged exposure to a pitch-forming non-coking temperature in a still, with agitation of the liquid, and exposure of the same to air, substantially as described.

5. The improvement in making asphaltic or pitchy bodies, by distilling a mixture of petroleum tar or mineral tar (or petroleum or tar-forming mineral oil) and rosin, the distillation of such mixture or the residue thereof being continued at a pitch-forming, or a pitch-forming non-coking, temperature, substantially as described.

6. The process of making asphaltic or pitchy bodies, by prolonged exposure of petroleum tar to a pitch-forming temperature in a still, with agitation of said tar, and exposure of the same to air, substantially as described.

7. The process of making asphaltic or pitchy bodies, by prolonged exposure of petroleum tar to a pitch-forming temperature in a still, with exhaustion of the products of distillation, agitation of said tar, and exposure of the same to air, substantially as described.

8. The process of making asphaltic or pitchy bodies, by subjecting pitch-yielding tar to a pitch-forming non-coking temperature, with agitation of the tar, and exposure of the same to air, substantially as described.

9. The process of making asphaltic or pitchy bodies, by subjecting pitch-yielding tar to a pitch-forming non-coking temperature, with exhaustion of the products of distillation, agitation of the tar, and exposure of the same to air, substantially as described.

10. The process of distilling petroleum or pitch-forming oil (including tar), by heating the same in a still, with exhaustion of the products of distillation, agitation of the oil, and exposure to air, the temperature of said oil being gradually increased during the distillation to a pitch-forming non-coking temperature and continued at such temperature until a solid or product solidifying on cooling is obtained, substantially as described.

11. A distilling apparatus comprising a still with a fire chamber for external heating and a number of inside pipes descending through the vapor space into the liquid space of the still and terminating near the bottom in openings the full diameters of the pipe bores, and means for introducing aeriform fluid through said pipes, the said pipes being adapted for the admission and passage through them of a clearing tool, substantially as described.

12. A distilling apparatus comprising a still with a fire chamber for external heating and a number of inside pipes communicating with the atmosphere outside the still and descending through the vapor space into the liquid space of the still, the said pipes terminating near the still bottom in openings the full diameters of the pipe bores and being adapted for the admission and passage through them of a clearing tool, in combination with a condenser communicating with the vapor space of the still, and an air pump also communicating therewith, substantially as described.

In testimony whereof I affix my signature in presence of two witnesses.

FRANCIS X. BYERLEY.

Witnesses:
GEO. W. DREW,
C. J. HEDRICK.